(12) United States Patent
Ali

(10) Patent No.: US 11,509,138 B1
(45) Date of Patent: Nov. 22, 2022

(54) SYSTEM AND METHOD FOR IMPROVING TRANSIENT STABILITY OF GRID-CONNECTED WIND GENERATOR SYSTEM

(71) Applicant: Mohd Hasan Ali, Germantown, TN (US)

(72) Inventor: Mohd Hasan Ali, Germantown, TN (US)

( * ) Notice: Subject to any disclaimer, the term of this patent is extended or adjusted under 35 U.S.C. 154(b) by 0 days.

(21) Appl. No.: 17/332,623

(22) Filed: May 27, 2021

Related U.S. Application Data

(60) Provisional application No. 63/030,801, filed on May 27, 2020.

(51) Int. Cl.
*H02J 3/18* (2006.01)
*H02J 3/38* (2006.01)

(52) U.S. Cl.
CPC .............. *H02J 3/18* (2013.01); *H02J 3/381* (2013.01); *H02J 2300/28* (2020.01)

(58) Field of Classification Search
CPC ...... H02J 3/18; H02J 3/381; H02J 3/38; H02J 2300/28
See application file for complete search history.

(56) References Cited

U.S. PATENT DOCUMENTS 8,615,331 B2 * 12/2013 Garcia .................... H02P 9/102
700/286

* cited by examiner

*Primary Examiner* — Robert L Deberadinis
(74) *Attorney, Agent, or Firm* — Wayne Edward Ramage; Baker Donelson

(57) ABSTRACT

A power electronic control-based capacitor to be used at the terminal of a grid-connected wind generator system for improving the transient stability of the generator following a fault in the network. This eliminates the need of adding auxiliary control devices at the grid side. The wind generator terminal capacitor is controlled through power electronics in such a way as to function both at the steady state and transient conditions maintaining the stability of the wind generator. A power electronic control-based terminal capacitor ("C") is connected through two back-to-back thyristor switching devices, T1 and T2. The function of the capacitor depends on the triggering or firing-angle of the thyristor switches, which varies from 0 degrees to 180 degrees.

9 Claims, 4 Drawing Sheets

Reactive power, $Q_C = i_C^2 X_C$ ......(1) where $i_C$ is the current flow through the capacitor, and $X_C$ is the capacitive reactance given by $X_C - 1/\omega c = 1/2\pi f c$ where f is the frequency and C is the capacitance.

Reactive power, $Q_C = i_C^2 X_C \ldots \ldots (1)$ where $i_C$ is the current flow through the capacitor, and $X_C$ is the capacitive reactance given by $X_C - 1/\omega C = 1/2\pi f c$ where f is the frequency and C is the capacitance.

SYSTEM AND METHOD FOR IMPROVING TRANSIENT STABILITY OF GRID-CONNECTED WIND GENERATOR SYSTEM

This application claims priority to U.S. Provisional App. No. 63/030,801, filed May 27, 2020, which is incorporated herein in its entirety by specific reference for all purposes.

FIELD OF INVENTION

This invention relates to an apparatus, system, and related methods to improve the transient stability of a wind generator system following a fault in the network.

SUMMARY OF INVENTION

In various exemplary embodiments, the present invention comprises a power electronic control-based capacitor to be used at the terminal of a grid-connected wind generator system for improving the transient stability of the generator following a fault in the network. The invention eliminates the need of adding auxiliary control devices at the grid side. More specifically, no auxiliary devices like a static var compensator (SVC) or static synchronous compensator (STATCOM) are used at the grid side during any network fault conditions. The wind generator terminal capacitor is controlled through power electronics in such a way as to function both at the steady state and transient conditions maintaining the stability of the wind generator. Therefore, the cost of using any auxiliary devices can be saved. The present invention is useful to wind generator manufacturing companies and electric power industries.

In several embodiments, a power electronic control-based terminal capacitor ("C") is connected through two back-to-back thyristor switching devices, T1 and T2. The function of the capacitor depends on the triggering or firing-angle of the thyristor switches, which varies from 0 degrees to 180 degrees. At 0 degrees, the full conduction or the full current flow through the thyristor device, and hence through the capacitor. At 180 degrees, there is zero conduction or no current flow through the capacitor. When the thyristor operates, the capacitor controls the reactive power.

It is noteworthy that during a fault period, the firing angle should be close to zero, so that the reactive power consumption by the capacitor is high. On the other hand, during normal or steady state conditions, the firing angle should be large (e.g., about 160 degrees).

DETAILED DESCRIPTION OF EXEMPLARY EMBODIMENTS

In various exemplary embodiments, the present invention comprises a power electronic control-based capacitor to be used at the terminal of a grid-connected wind generator system for improving the transient stability of the generator following a fault in the network.

Figure 1:
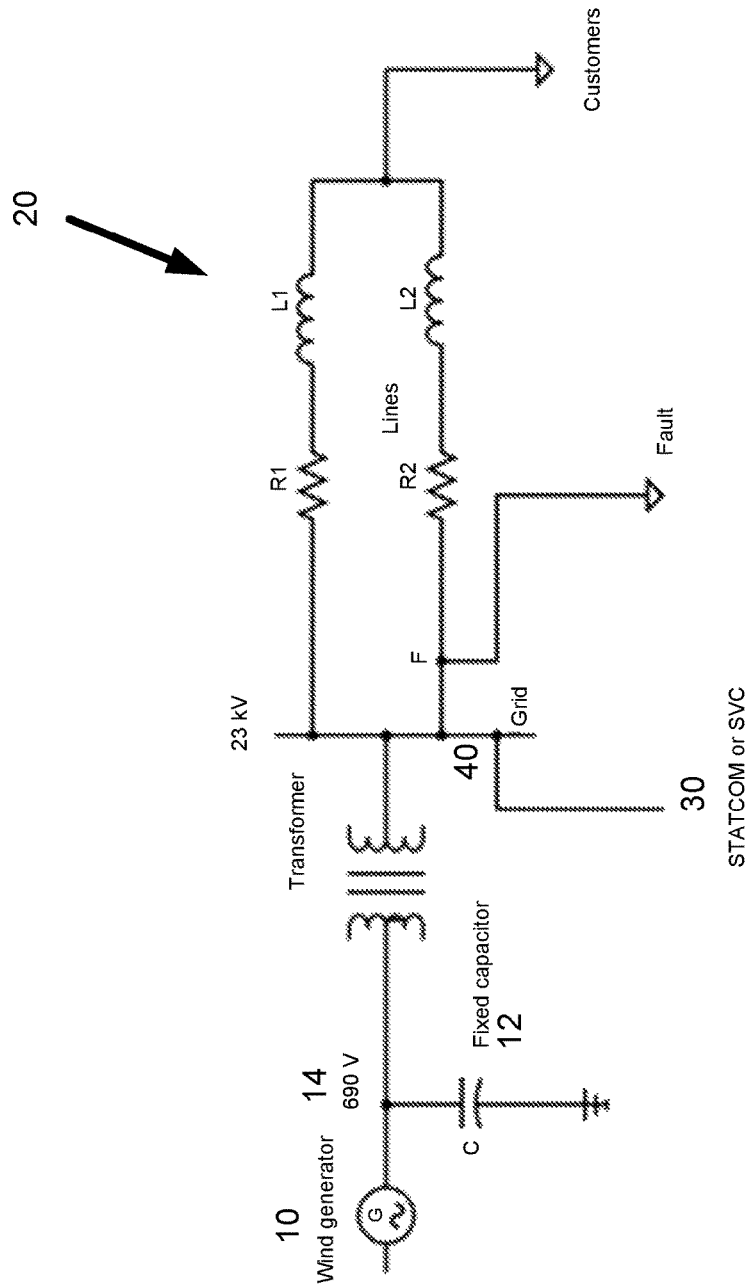
FIG. 1 shows a diagram of a wind generator system with a fixed capacitor ("C").

Due to their low cost, simple and rugged construction, squirrel-cage induction machines (SCIM) are mostly used for wind generator systems. Since SCIM-based wind generators do not have any physical magnetic poles, in order to produce the required magnetization the wind generator 10 always draws reactive power from the power network or grid 20. But drawing the reactive power from the power network causes a voltage sag at the generator terminal. Therefore, a capacitor "C" 12 (which is uncontrolled and fixed), as shown in FIG. 1, is connected at the terminal 14 of the wind generator 10 to compensate for the reactive power demand at the steady state so that the rated terminal voltage and active power is maintained.

During any faults on the power grid 20, the wind generator 10 terminal voltage goes very low. Therefore, in order to raise and maintain the rated terminal voltage during a fault, typically a reactive power compensator such as a static var compensator (SVC) or a static synchronous compensator (STATCOM) 30, along with the appropriate control techniques, is used at the grid point. Thus, the transient stability of the wind generator system is maintained.

Figure 2:
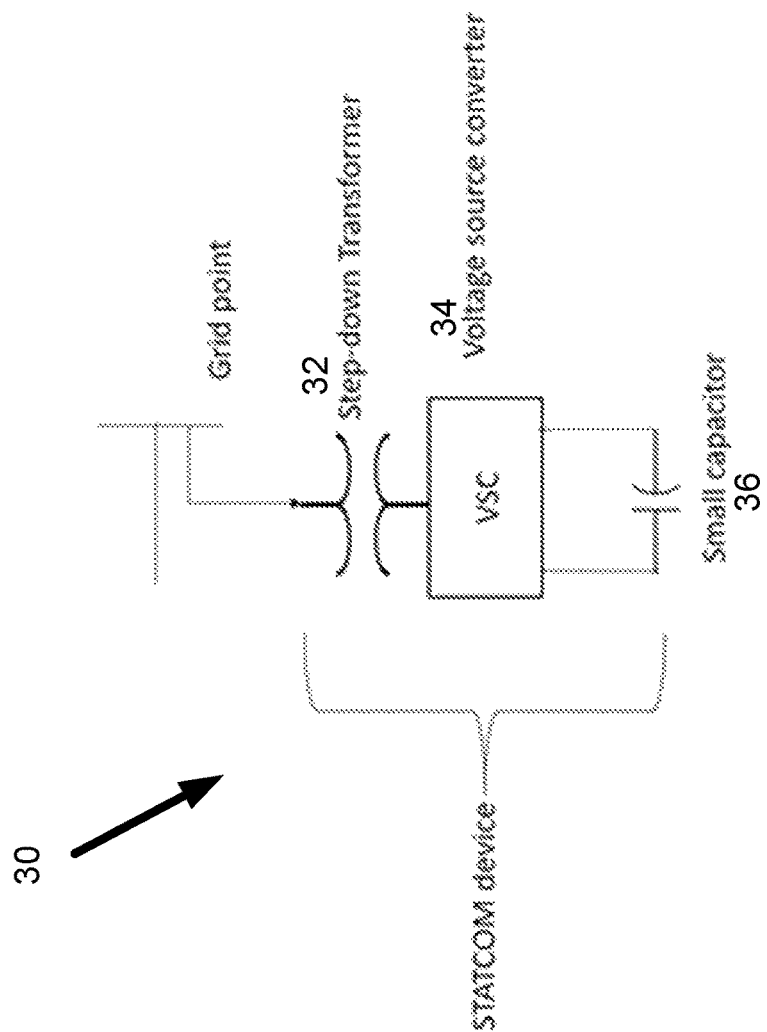
FIG. 2 shows an exemplary configuration of a STATCOM device.

The structure of a typical STATCOM device 30 is shown in FIG. 2. A STATCOM device typically comprises a step-down transformer 32, a voltage source converter (VSC) 34 and associated VSC controller, and a small capacitor 36. The two reactive power compensators, such as the uncontrolled fixed capacitor 12 and the STATCOM/SVC 30, work for the wind generator under fault conditions to maintain the transient stability of the wind generator 10.

In various exemplary embodiments, the present invention eliminates the need for a STATCOM/SVC. The transient stability of the wind generator 10 thereby is maintained by using only one reactive power compensator 112. Since the uncontrolled fixed capacitor 12 is always needed at the terminal 14 of the wind generator 10, it cannot be removed. In the present invention, the auxiliary device (STATCOM/SVC) 30 is removed, and transient stability is achieved by controlling the fixed capacitor 12 through an appropriate technique as described herein.

The invention eliminates the need of adding auxiliary control devices at the grid side. More specifically, no auxiliary devices like a static var compensator (SVC) or static synchronous compensator (STATCOM) are used at the grid side during any network fault conditions. The wind generator 10 terminal capacitor 12 is controlled through power electronics in such a way as to function both at steady state and transient condition, thus maintaining the stability of the wind generator 10. Therefore, the cost of using any auxiliary devices 30 can be eliminated. The present invention is useful to wind generator manufacturing companies and electric power industries.

Figure 3:
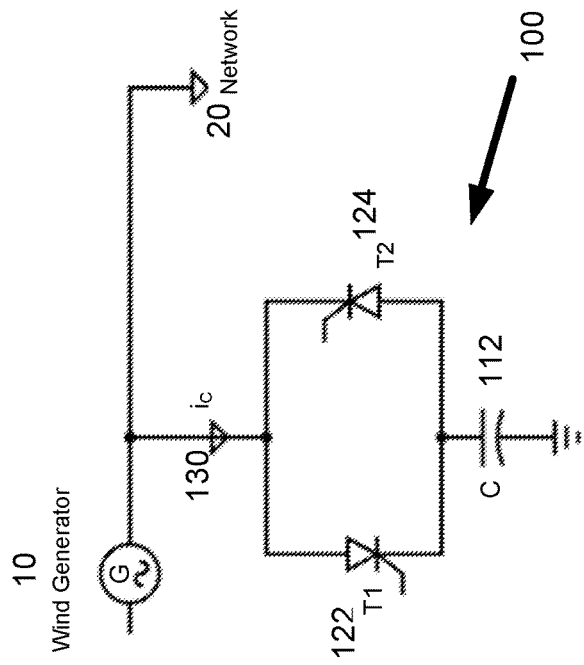
FIG. 3 shows a thyristor switched single-phase capacitor arrangement.

FIG. 3 shows the power electronic control-based terminal capacitor ("C") 112 connected through the two back-to-back thyristor switching devices, T1 122 and T2 124. This shows one phase of the three-phase system, with the other two phases having similar configurations. The terminal capacitor thus requires only six thyristors for a three-phase system. The present invention thus eliminates the need for a step-down transformer, a voltage source converter with six diodes, a small capacitor, and associated VSC controller, that would be required for a prior-art auxiliary device, such as the STATCOM.

The function of the capacitor 112 depends on the triggering or firing-angle of the thyristor switches 122, 124, which varies from 0 degrees to 180 degrees. At 0 degrees, the full conduction or the full current 130 flow through the thyristor device, and hence through the capacitor 112. At 180 degrees, there is zero conduction or no current flow through the capacitor 112. When the thyristor device operates, the capacitor 112 controls the reactive power, Qc, which can be shown mathematically through equation (1) in FIG. 3.

Figure 4:
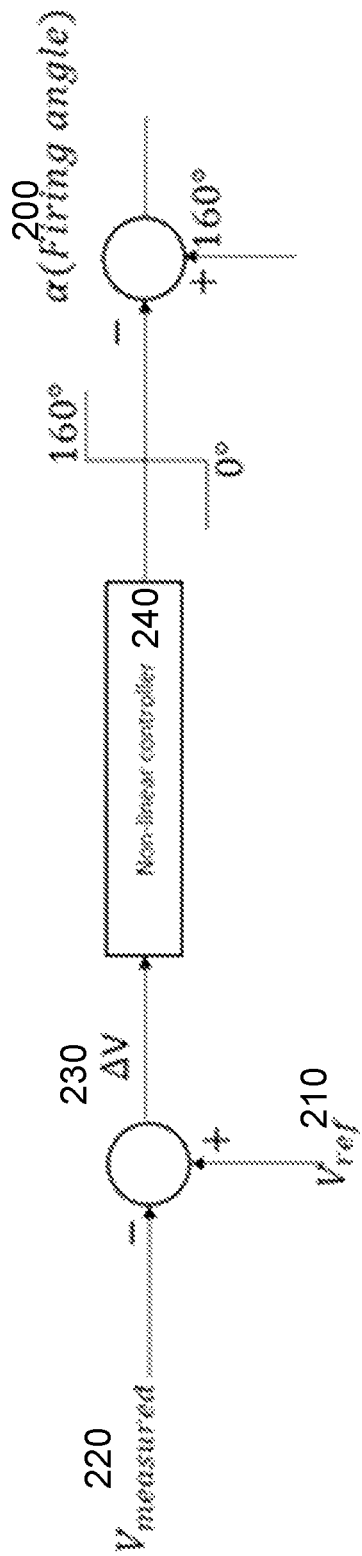
FIG. 4 shows a control block diagram for firing-angle generation.

It is noteworthy that during a fault period, the firing angle should be close to zero, so that the reactive power consumption by the capacitor is high. On the other hand, during normal or steady state conditions, the firing angle should be large (e.g., about 160 degrees). FIG. 4 shows the control block diagram to generate the required firing-angle 200 for the thyristor switches. As seen, Vref 210 is the reference or rated voltage, Vmeas 220 is the measured voltage and ΔV 230 is the voltage difference (the different between Vref and Vmeas) which progresses through the non-linear controller 240, and finally the firing-angle is produced.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A power generation system, comprising:
 a wind generator with a terminal configured to connect to a power grid at a grid point; and
 a reactive power compensator, comprising a power electronic control-based capacitor attached to the terminal.

2. The system of claim 1, wherein the power electronic control-based capacitor is connected to a first thyristor switch and a second thyristor switch.

3. The system of claim 2, wherein the first thyristor switch and the second thyristor switch are back-to-back.

4. The system of claim 2, wherein the amount of current flow through the power electronic control-based capacitor is determined by the firing-angle of the first thyristor switch and the second thyristor switch.

5. The system of claim 4, wherein the reactive power compensator further comprises a non-linear controller.

6. The system of claim 5, wherein the non-linear controller produces the firing angle based on a voltage difference between a reference or rated voltage and a measured voltage.

7. The system of claim 6, wherein the amount of current flow is full at a firing angle of 0 degrees, and the amount of current flow is zero at a firing angle of 180 degrees.

8. The system of claim 1, wherein the system does not comprise a static synchronous compensator or a static var compensator connected to the grid point.

9. The system of claim 1, wherein the system does not comprise an uncontrolled fixed capacitor connected to the terminal.

* * * * *